Dec. 9, 1958    F. E. JOHNSON, JR    2,864,071
CLAMPING DEVICE FOR ELECTRIC WIRES
Filed Feb. 11, 1954    3 Sheets-Sheet 1

INVENTOR.
Frank E. Johnson, Jr.,
BY
Smith, Olsen, Baird & Gulbrandsen
Attys.

Dec. 9, 1958     F. E. JOHNSON, JR     2,864,071
CLAMPING DEVICE FOR ELECTRIC WIRES
Filed Feb. 11, 1954     3 Sheets-Sheet 2
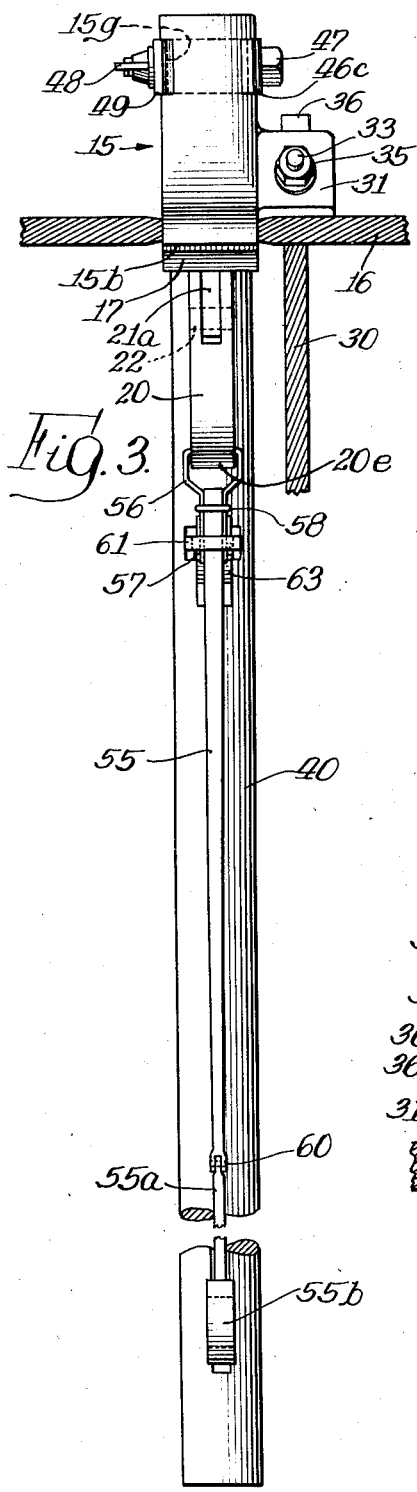
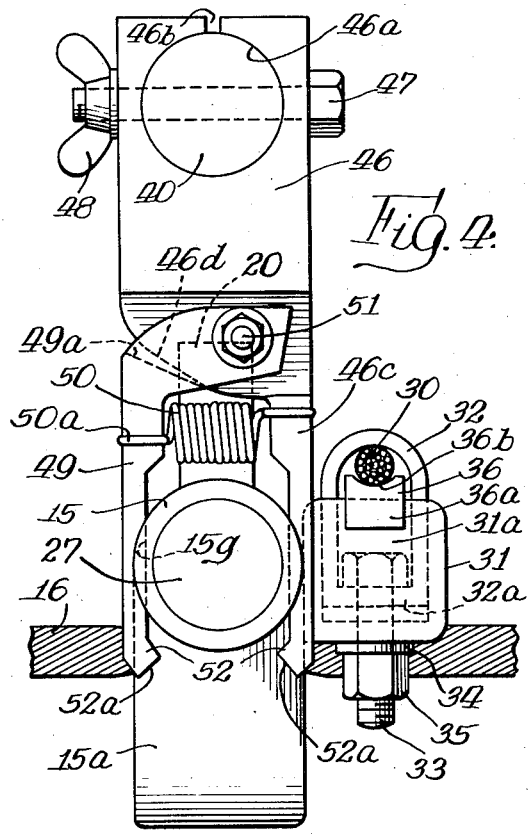
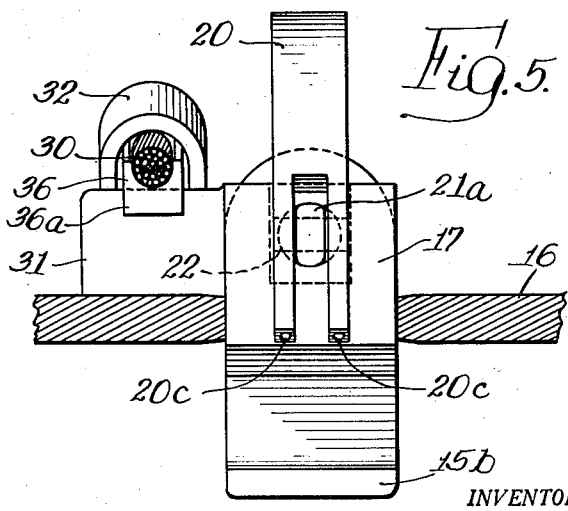
INVENTOR.
Frank E. Johnson, Jr.,
BY
Smith, Olsen, Baird & Gulbrandsen,
Attys.

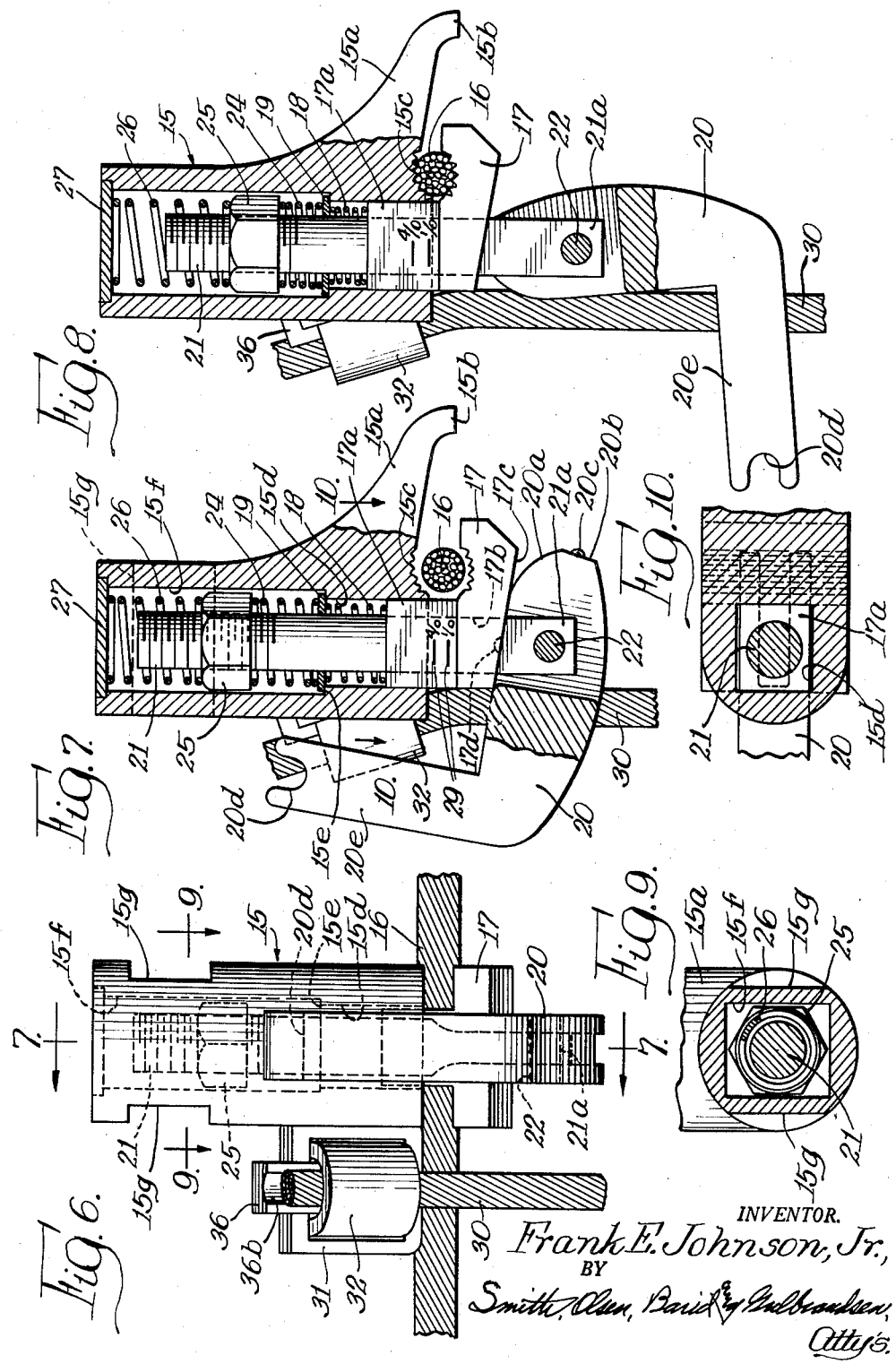

United States Patent Office 2,864,071
Patented Dec. 9, 1958

2,864,071

CLAMPING DEVICE FOR ELECTRIC WIRES

Frank E. Johnson, Jr., New Orleans, La.

Application February 11, 1954, Serial No. 409,717

3 Claims. (Cl. 339—109)

This invention relates to improvements in clamping devices for electric wires and its purpose is to provide means by which an electric connnection may quickly be made between a line conductor, such as a "live" or energized line wire, and a branch conductor or "jumper" wire. Also, this connection may be easily broken, when desired.

It is common practice in the construction, repair and operation of electric lines for linemen to make connections, either of a permanent or a temporary nature, with line wires which are connected in an active or energized circuit and which are commonly referred to as "live" wires or "hot" wires. The making of such connections involves some danger to the lineman and may result in damage to the wires and to the apparatus used if arcing occurs while the connection is being completed.

The principal object of the present invention is to provide an improved clamping device, capable of use as a "hot wire" clamp, which may be safely and quickly operated to make connections between two electric wires. A further object is to provide means for forming between two wires a firm connection which is not likely to become loosened by vibration or the like during service. Another object is to provide an improved clamping device adapted to be mounted on a long supporting handle and to be operated for detachably connecting and disconnecting two wires in an elevated position. A further object is to provide a clamping device having relatively movable jaws which are controlled partly by spring action and partly by the manual operation of the lineman located in a remote position. Still another object of the invention is to provide a clamping device having one clamp for forming a connection with one wire and another clamp adapted to be operated from a remote position for connecting the device to another wire and thereby establishing a connection through the device between the two wires. Other objects relate to various features of construction and arrangement which will appear more fully hereinafter.

The nature of the invention will be understood from the following specification taken with the accompanying drawings in which one embodiment is illustrated. In the drawings, Figure 1 shows a side elevation of the improved clamping device for the present invention with one clamp engaging one wire and with a pair of jaws in open position in readiness to clamp another wire;

Fig. 3 shows an end elevation of the clamping device indicated by the line 3—3 of Fig. 2;

Fig. 4 shows an enlarged top plan view of the wire clamping device illustrated in Fig. 1;

Fig. 5 shows a sectional view taken on the line 5—5 of Fig. 1;

Fig. 6 shows an elevation of the wire clamping portions of the device, looking toward the right as viewed in Fig. 1;

Fig. 7 shows a vertical section taken on the line 7—7 of Fig. 6 with the relatively movable jaws in open position;

Fig. 8 is a sectional view similar to that of Fig. 7 with the relatively movable jaws in closed position;

Fig. 9 shows a transverse section taken on the line 9—9 of Fig. 6; and

Fig. 10 shows a transverse section taken on the line 10—10 of Fig. 7.

Figure 1:
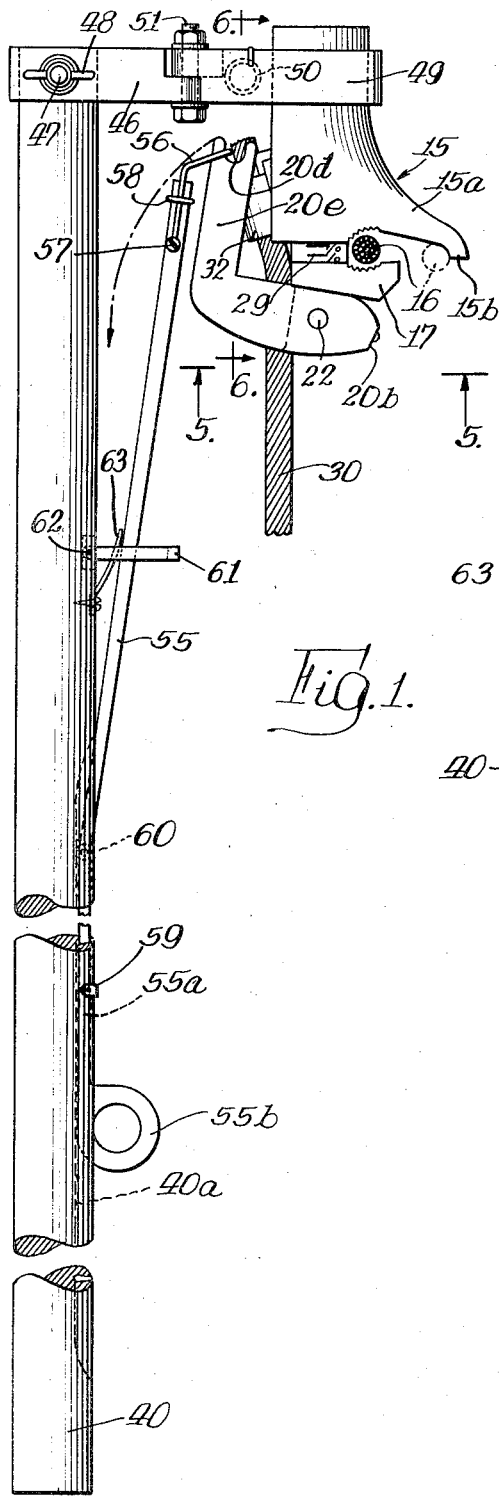

As illustrated in the drawings, the invention comprises a clamping frame 15 having a transversely projecting and downwardly inclined jaw 15a terminating in a downturned extremity 15b adatped to be hooked over an electric wire or cable 16 with which a connection is to be made. The jaw 15a is provided near its base with a serrated under surface 15c adapted to coact with the wire 16 which is held in fixed position against this serrated surface by a relatively movable jaw 17 when this movable jaw is moved upwardly to the gripping position shown in Fig. 2. The frame 15 is provided with a tubular passage of rectangular cross section extending vertically therethrough and the lower portion 15d of this passage is slidably fitted by the rectangular upward extension 17a of the movable jaw 17. A coil spring 18 is mounted in the passage 15d with its lower end bearing on the portion 17a of the jaw and with its upper end bearing against a washer 19 which is seated upon an annular shoulder 15e formed in the frame member as hereinafter more fully described. The spring 18 thus tends normally to move the jaw 17 downwardly to the open position shown in Figs. 1 and 7.

Figure 2:
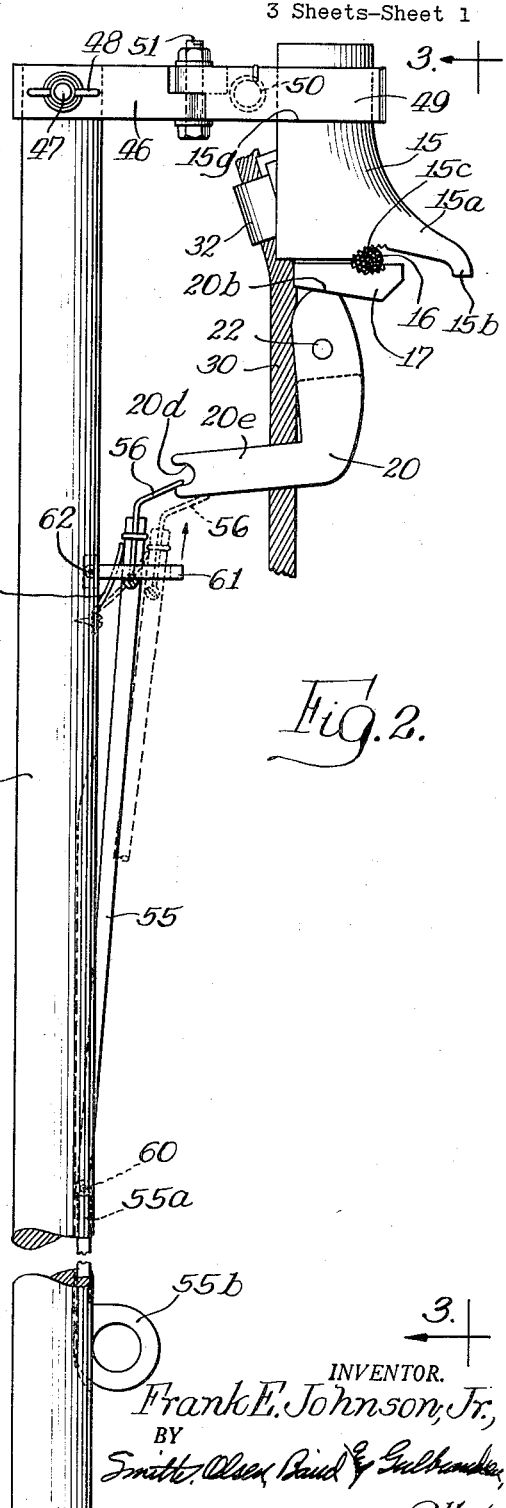
Fig. 2 shows a view similar to that of Fig. 1 after the relatively movable jaws of the clamping device have been operated to grip the second wire.

The jaw 17 is adapted to be moved from the open position to the closed position shown in Figs. 2 and 8 by means of a bell crank lever 20 which has one arm thereof formed as a cam which is bifurcated to receive a flange 21a formed on the lower end of a plunger 21 which is of rectangular cross section at its lower end and which has an upper threaded portion of circular cross section arranged to extend through a passage 17b in the jaw 17 and thence upwardly through the upright passage which is formed in the frame 15. The bifurcated extremity of the lever 20 is pivotally connected to the plunger 21 by means of a pin 22 and the straight portion of the cam surface 20a of the lever 20 normally lies in contact with the inclined under face 17c of the movable jaw member. The plunger 21 extends through the passage 15d of the frame 15, through the washer 19, and partially through the passage 15f of rectangular cross section which is somewhat larger in cross sectional area than the passage 15d. A heavy coil spring 24 is mounted around the plunger 21 between the washer 19 and a hexagonal nut 25 which threadedly engages the upper threaded portion of the plunger 21 and which is held against rotation by the walls of the passage or chamber 15f. The spring 24 thus bears against the washer 19 and the under side of the nut 25 with the result that the plunger 21 and the lever 20 are normally held in the positions shown in Figs. 1 and 7. A coil spring 26 is mounted in the upper part of the chamber 15e between the nut 25 and a plate 27 which is secured in the upper end of the passage formed in the frame or casing 15 to close the upper end of the passage and to provide a seat for the spring 26. The spring 26 exerts a pressure against the nut 25 and this is communicated to the plunger 21 and the jaw 17 so that this jaw is held in open position with respect to the upper jaw 15a at all times when the bell crank lever 20 is in the position shown in Figs. 1 and 7, thus enabling the clamp to be hooked over the wire or cable 16 with a minimum of trouble.

In order to vary the normal spaced relation of the jaws 15a and 17 when they are in the open positions shown in Figs. 1 and 7, the plunger 21 may be rotated by manipulating the lever 20 for the purpose of varying the position of the plunger in the nut 25 and thereby adjusting the normal compression of the spring 24. This adjustment may be made in advance depending upon the size of the wire or cable 16 which is to be gripped by the device and the normal spaced relation of the jaws when they are in open position may be indicated by graduations 29 formed on the side face of the extension 17a of the jaw 17 and adapted to be read with reference to the bottom edge of the frame or casing 15, thus enabling the operator to obtain the desired adjustment of the jaws before the device is otherwise in readiness for operation.

When it is desired to close the jaws upon the wire or cable 16, the bell crank lever 20 is swung from the position shown in Figs. 1 and 7 to the position shown in Figs. 2 and 8, thereby causing the flat nose or end face 20b of the lever to ride upwardly into engagement with the bottom surface 17c of the jaw 17, while at the same time pulling the plunger 21 downwardly against the compression of the spring 24 and compressing the spring 18 as the jaw 17 moves upwardly. The spring 26 in the upper end of the frame or casing simultaneously expands so that at the end of the operation the parts have the relative positions shown in Fig. 8. The lever 20 is adapted to retain the position shown in Figs. 2 and 8 after being moved to that position by the coaction of the flat surfaces 20b and 17c but the continuance of this contact may be further insured by providing a rounded projection 20c on the end of the lever 20 which is adapted to move into interlocking engagement with a rounded recess 17d formed in the under side of the jaw member 17. The resilience of the springs 18 and 24 is such that the projections 20c may be snapped into and out of engagement with the recess 17d without difficult. When it is desired to release the wire or cable 16, the lever 20 may be restored to the position shown in Figs. 1 and 7, whereupon the springs 18, 24 and 26 will cause the parts to assume automatically the normal positions wherein the wire or cable 16 is released.

Before describing the means by which the lever 20 is operated and the means by which the frame or casing 15 is supported when in use, reference will be made to the fact that the frame or casing 15 has secured to one side thereof an auxiliary clamping device by means of which a connection is made with another wire or cable 30 which is to be electrically connected to the wire or cable 16 through the frame or casing 15. This auxiliary clamping device comprises a bracket 31 which is cast integrally with the frame 15 or is welded or otherwise secured to the side of the frame 15 and which has mounted therein a U-shaped clamping member 32 having its arms united with a transverse portion 32a provided with an aperture which is engaged by a bolt 33. A washer 34 and a nut 35 are mounted upon the threaded end of the bolt and the head of the bolt occupies a position seated against the transverse portion 32a of the clamping member within the bracket 31. A saddle member 36 seats upon the side walls 31a of the bracket with its extremities 36a extending downwardly at the sides of these walls 31a. This saddle member has a curved seat 36b adapted to receive the wire or cable 30 which is extended through the U-shaped clamping member 32. By tightening the bolt 35, the clamping member 32 may be moved with respect to the bracket 31 to clamp the wire or cable 30 securely between the clamping member and the saddle member 36. This connection with the wire or cable 30 is made preliminary to the operation of the clamping mechanism previously described by which a connection is established between the frame or casing 15 and the wire or cable 16.

In order to elevate the clamping device to a position where a connection may be established between the wire or cable 30 and the wire or cable 16, which may be a line wire carrying current, the clamping device is adapted to be mounted at the upper end of a rod or stick 40 formed of wood or other light weight material which will serve as an electric insulator for the lineman who holds its lower end while the clamping device is being moved and operated. The upper end of the stick 40 engages a curved aperture 46a formed in one end of a bracket 46 which is split as shown at 46b so that the walls of the aperture 46a may be contracted about the upper end of the stick 40 by means of a bolt 47 which passes through the bracket and through the stick and which is engaged at its other end by a wing nut 48. The bracket 46 has a horizontally extending arm or jaw 46c which is stationary with respect to the body of the bracket and which is adapted to cooperate with a movable arm or jaw 49 for the purpose of gripping the upper part of the frame or casing 15 which is provided on its opposite sides with annular parallel grooves 15g, shown particularly in Fig. 6, adapted to receive the arms 46c and 49. These arms are normally moved toward each other by a coil spring 50 having extremities 50a which are extended about the arms. This spring normally holds the arms in a partially open position, the movement of the arm 49 about its pivot 51 on the bracket 46 being limited by the engagement of a surface 49a on the movable arm with a surface 46d on the bracket.

The arms 46c and 49 are thus held normally in a position where they may be readily moved into and out of engagement with the parallel grooves 15g in the frame 15, and for this purpose these arms are provided at their ends with extremities 52 directed toward each other and provided with flat end surfaces 52a adapted to coact with the opposite faces of the grooves 15g and to force the arms apart against the tension of the spring 50 when the bracket 46 is moved into engagement with the frame. The clamping device is thus definitely position with respect to the stick 40. Similarly, the arms may be snapped out of engagement with the frame 15 by moving the bracket 46 and the stick 40 in the reverse direction, whereupon the arms 46c and 49 separate against the tension of the spring 50 and then snap back to their normal partially separated positions after the frame 15 has been released.

Assuming that the frame 15 has been mounted in the bracket 46 at the end of the rod or stick 40, the lineman elevates the clamping device along with the wire 30 and passes the jaw 15a into engagement with the wire or cable 16, this operation being facilitated by the down-turned extension 15b of the jaw 15a which permits it to be hooked over the line wire 16. When the bracket has been thus located on the wire 16, the bell crank lever 20 may be operated to move the jaw 17 from the position shown in Figs. 1 and 7 to the position shown in Figs. 2 and 8 and this is effected by an operating rod or stick 55 which is mounted upon the rod or stick 40 and which is provided at its upper end with a wire loop 56 adapted to be hooked into engagement with the forked extremity 20d of the arm 20e of the lever, in the manner shown in Fig. 1. The wire loop 56 is rigidly secured on the rod or stick 55 by a screw 57 and an encircling band 58. The rod 55 is actuated by a handle portion 55a slidably mounted in a groove 40a formed in the supporting rod or stick 40 where it is held in position by clips 59. This handle portion has a loop 55b adapted to be engaged by a finger of the operator for pulling the stick 55 downwardly to actuate the lever 20, at which time the stick 55 swings about its pivot 60 on the handle portion 55a. When the lever 20 has reached the position shown in Fig. 2, a further downward pull on the stick 55 disengages the loop 56 from the worked extremity 20d of the lever 20, thereby permitting the withdrawal of the stick 40 and the bracket 46 from the frame 15 without disturbing the position of the lever 20. In this way, the clamping device may be quickly and safely operated by the lineman located in a position which is remote from the wire or cable 16 with which a connection is to be made.

When it is desired to break the connection between the wires 16 and 30, this may be readily accomplished from the normal position of the lineman by making use of the loop 56 and the rod 55 in the manner illustrated in Fig. 2. For this purpose, the lineman follows a procedure which is the reverse of that outlined above. With the operating stick 55 in the lowered position, the stick 40 is moved to a position wherein the jaws 49 and 46c are pushed into the parallel grooves 15g of the frame of the clamp. A leaf spring 63 is secured to the stick 40 and extends through the ring 61 which is pivoted at 62 on the stick. This spring bears against the operating stick 55 so that the stick 55 is normally forced by the spring against the outside of the ring 61, as shown in Fig. 2, with the result that the loop 56 is normally held in the position illustrated by dotted lines in Fig. 2 so that the operator may then thrust the rod 55 upwardly to cause the loop 56 to rotate the lever 20 and thereby release the gripping jaw 17. The clamp and the jumper or auxiliary wire 30 can then be lifted away from the line wire or cable 16.

From the foregoing description it will be apparent that the present invention provides an improved device by which an electric connection between two conductors or cables may be made safely and quickly by a workman who is located at some distance from the live wire to which the connection is made. Owing to the novel construction of the clamping device, the movable jaw may be caused to cooperate with the fixed jaw in gripping the wire upon movement of the movable jaw of the device against the compression of a spring by the action of the cam portion of the actuating lever. At the same time the reciprocating plunger is actuated by the cam to compress another spring so that a resilient pressure is exerted by the cam upon the movable jaw to cause this jaw to be retained in the wire gripping position. Its retention in this position is also insured by the coaction of the flat co-acting faces of the jaw and the cam and further insurance may be provided by a projection on the cam and a recess in the jaw. When it is desired to disconnect the auxiliary wire from the line wire, the reverse operation may be effected by the operation of the same rods or sticks which serve to support the clamping device and to actuate the operating lever during the initial application of the device to the wire and, at the conclusion of this reverse operation, the spring which is compressed during the initial closing of the movable jaw operates to restore that jaw to its normal open position in readiness for engagement with another wire.

Although one form of the invention has been shown and described by way of illustration, it will be understood that it may be constructed in various other embodiments which come within the scope of the appended claims.

I claim:

1. The combination in a wire clamping device, of a frame having a fixed jaw and a tubular bore, a second jaw mounted on said frame for relative movement with respect to said first jaw, said second jaw having an aperture therethrough, a plunger slidably mounted in said aperture and extending into said bore, a lever pivoted on said plunger and having a part adapted to actuate said second jaw, and a spring mounted in said bore between a part carried by said plunger and a part carried by said frame and actuated by said plunger for causing said lever to exert a resilient pressure on said second jaw.

2. The combination in a wire clamping device, of a frame having a fixed jaw and a tubular bore, a second jaw having a part slidably engaging said bore, a spring in said bore for normally holding said second jaw in open position, said second jaw having an aperture therethrough, a plunger slidably engaging said aperture and extending into said bore, a second spring mounted in said bore and arranged to be compressed by said plunger, and an operating lever pivoted on said plunger and having a part engaging said second jaw whereby movement of said lever closes said second jaw toward said first named jaw and compresses both of said springs.

3. The combination in a wire clamping device, of a frame having a fixed jaw and a tubular bore, a second jaw having a part slidably engaging said bore, a spring in said bore for normally holding said second jaw in open position, said second jaw having an aperture therethrough, a plunger slidably engaging said aperture and extending into said bore, a second spring mounted in said bore and adapted to be actuated by said plunger, an operating lever pivoted on said plunger and having a part engaging said second jaw whereby movement of said lever closes said second jaw toward said first named jaw and compresses both of said springs, and a third spring mounted in said bore and pressing on said plunger to lower said lever and thereby cause said second jaw and said first and second springs normally to assume positions wherein said second jaw is open with respect to said first jaw.

References Cited in the file of this patent

UNITED STATES PATENTS

| | | |
|---|---|---|
| 1,897,464 | Coon | Feb. 14, 1933 |
| 2,113,852 | Meade | Apr. 12, 1938 |
| 2,423,660 | Reynolds | July 8, 1947 |
| 2,447,324 | Fox | Aug. 17, 1948 |
| 2,448,402 | Thompson | Aug. 31, 1948 |
| 2,453,761 | Schoonmaker | Nov. 16, 1948 |
| 2,716,224 | Kruger | Aug. 23, 1955 |
| 2,738,480 | Hubbard | Mar. 13, 1956 |
| 2,742,806 | Pavelka | Apr. 24, 1956 |

FOREIGN PATENTS

| | | |
|---|---|---|
| 25,335 | Great Britain | Nov. 6, 1913 |
| 713,417 | Germany | Nov. 7, 1941 |
| 764,675 | France | Mar. 12, 1934 |